UNITED STATES PATENT OFFICE.

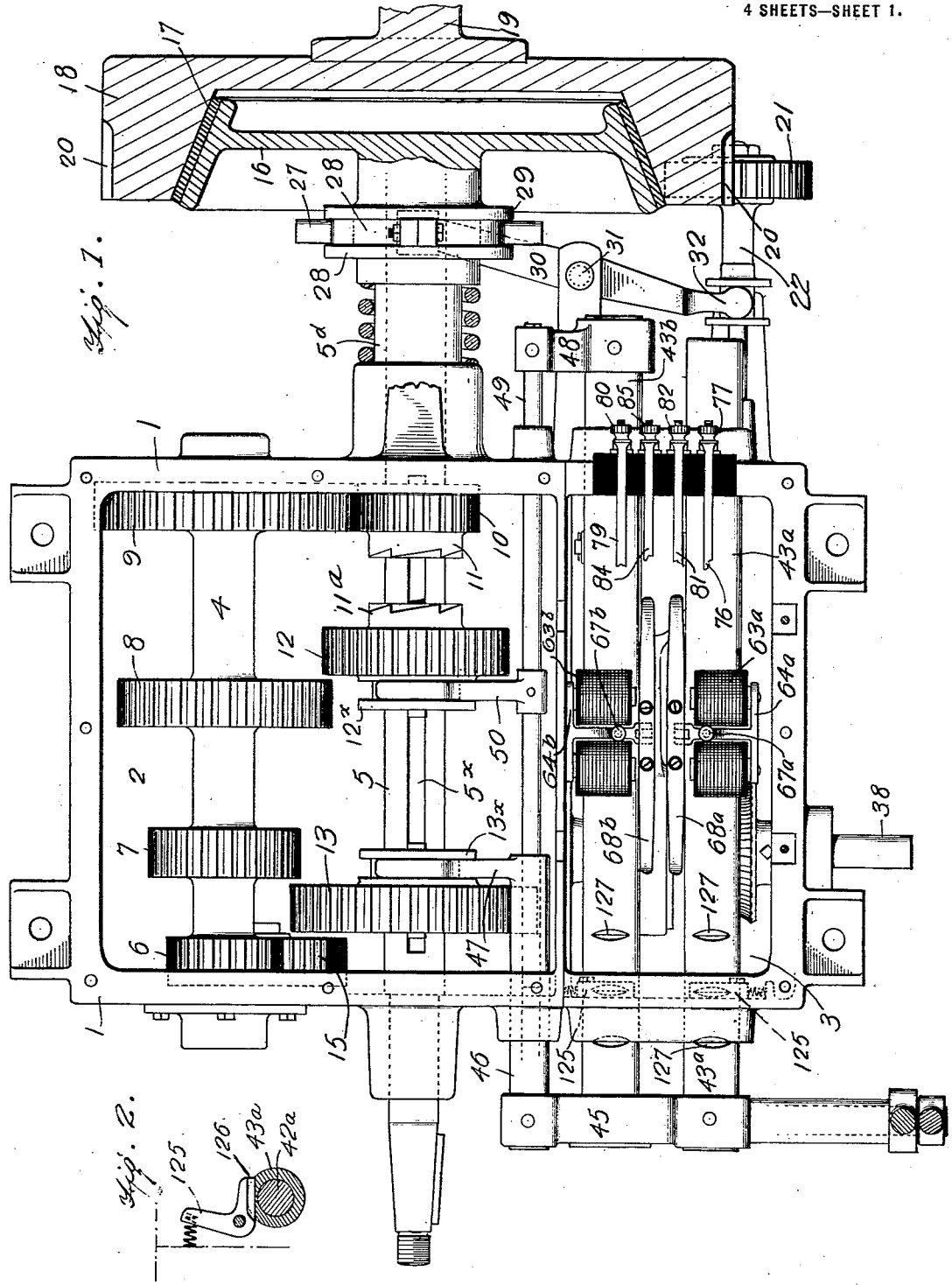

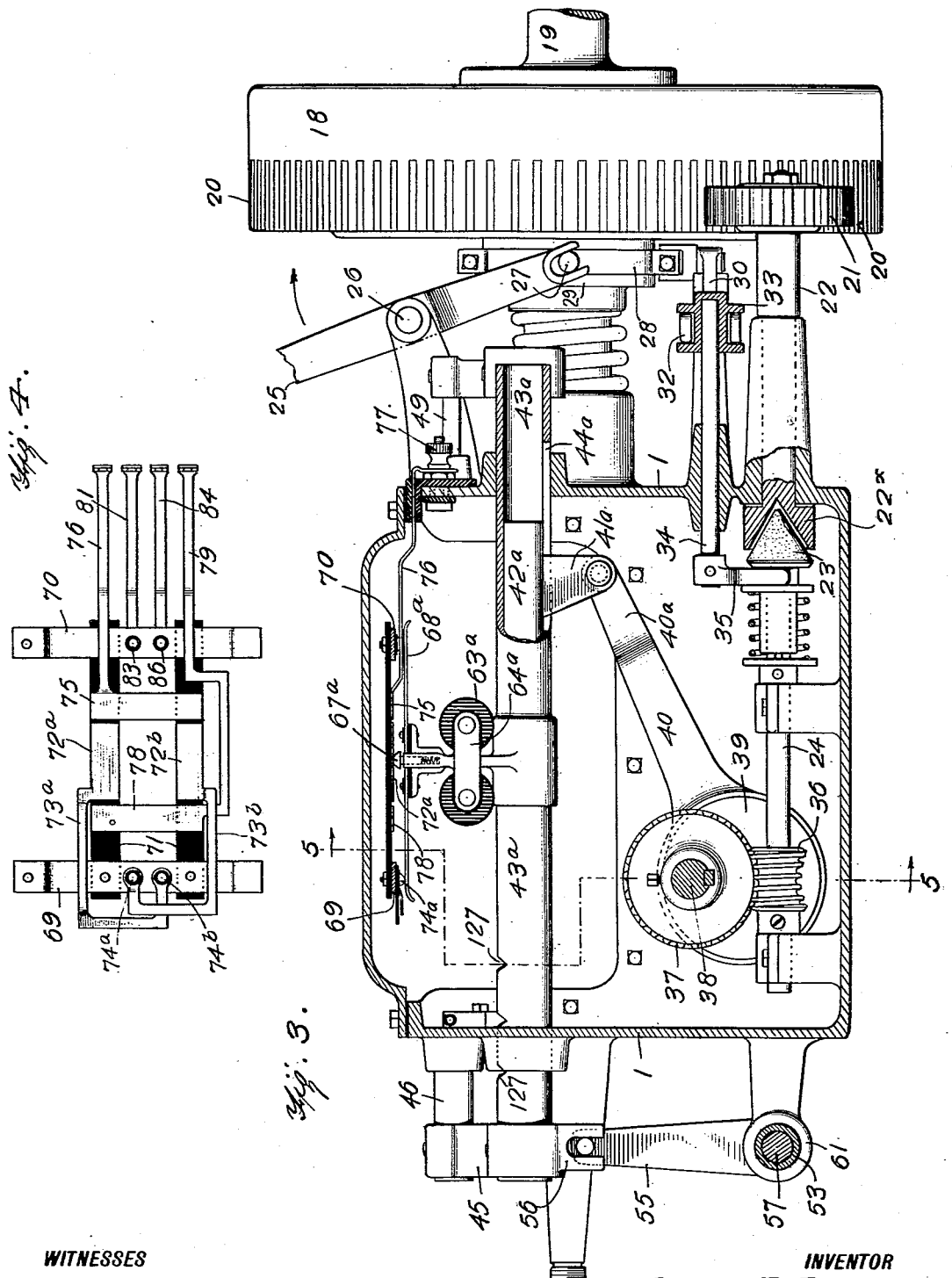

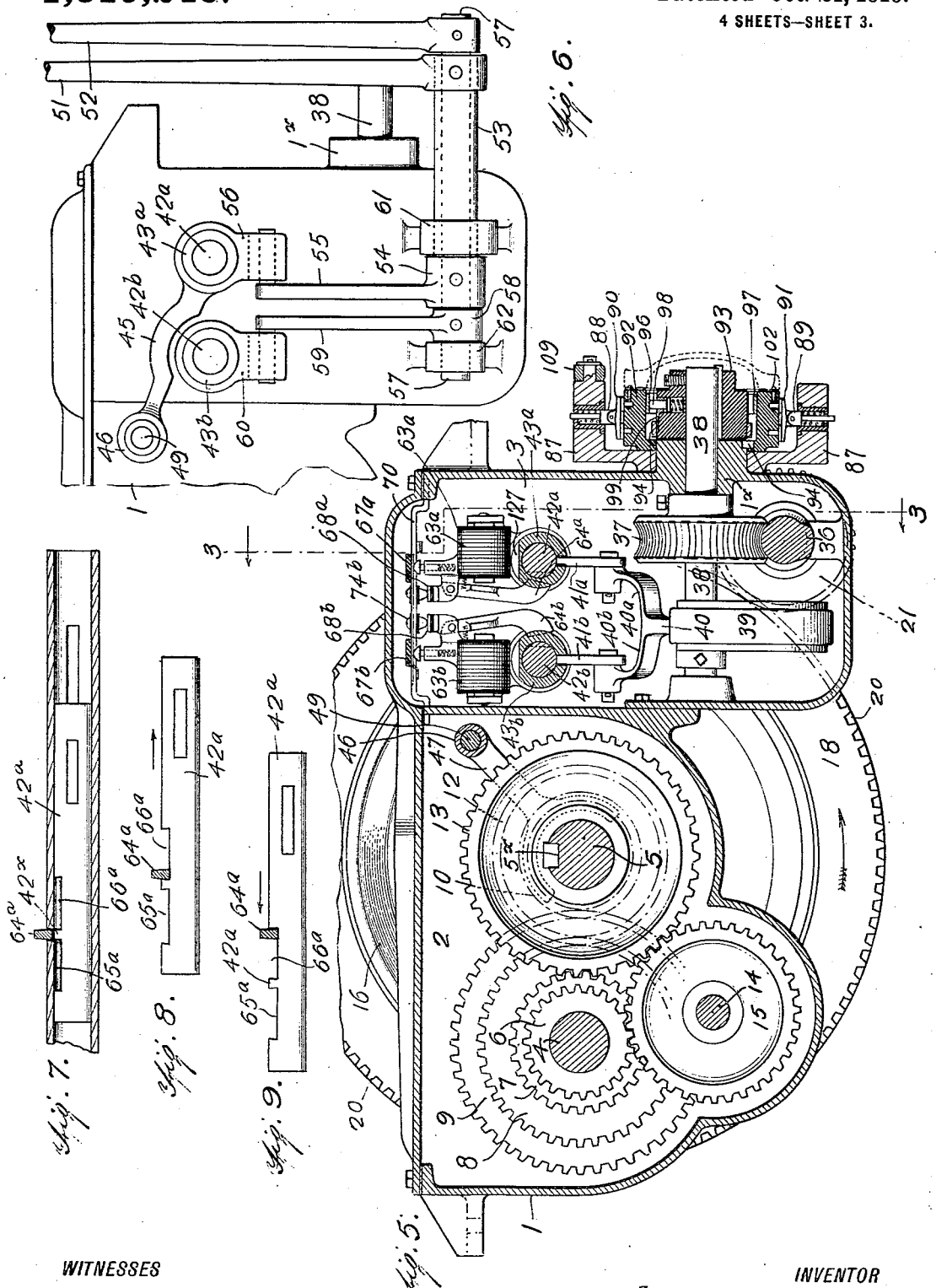

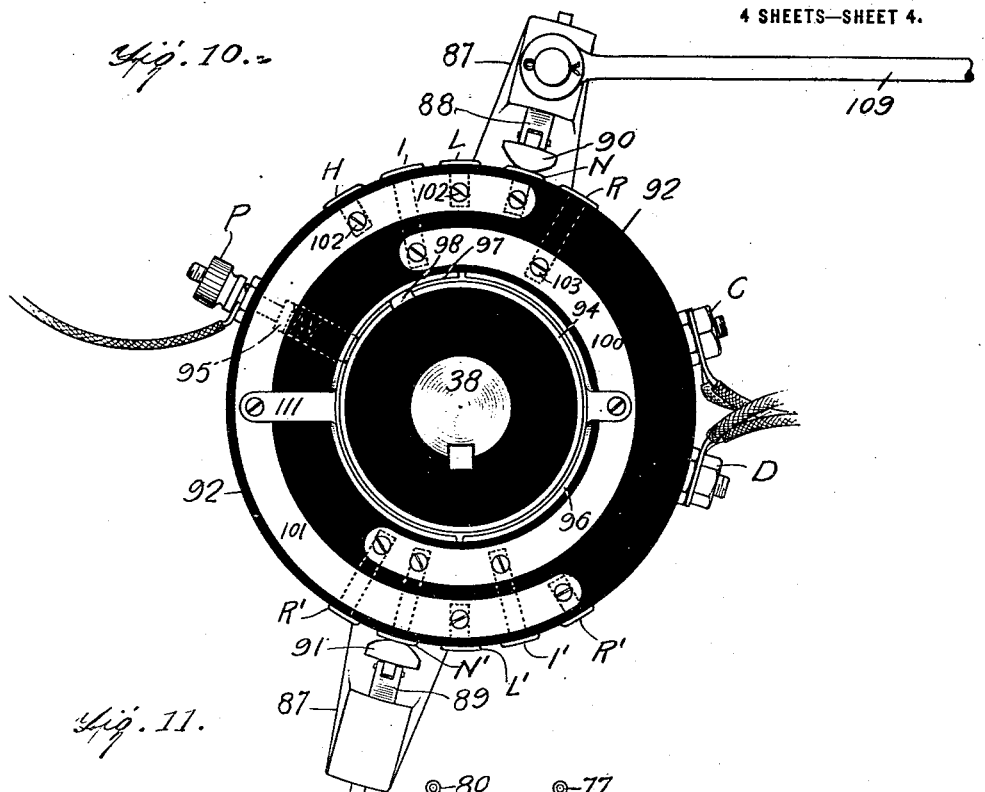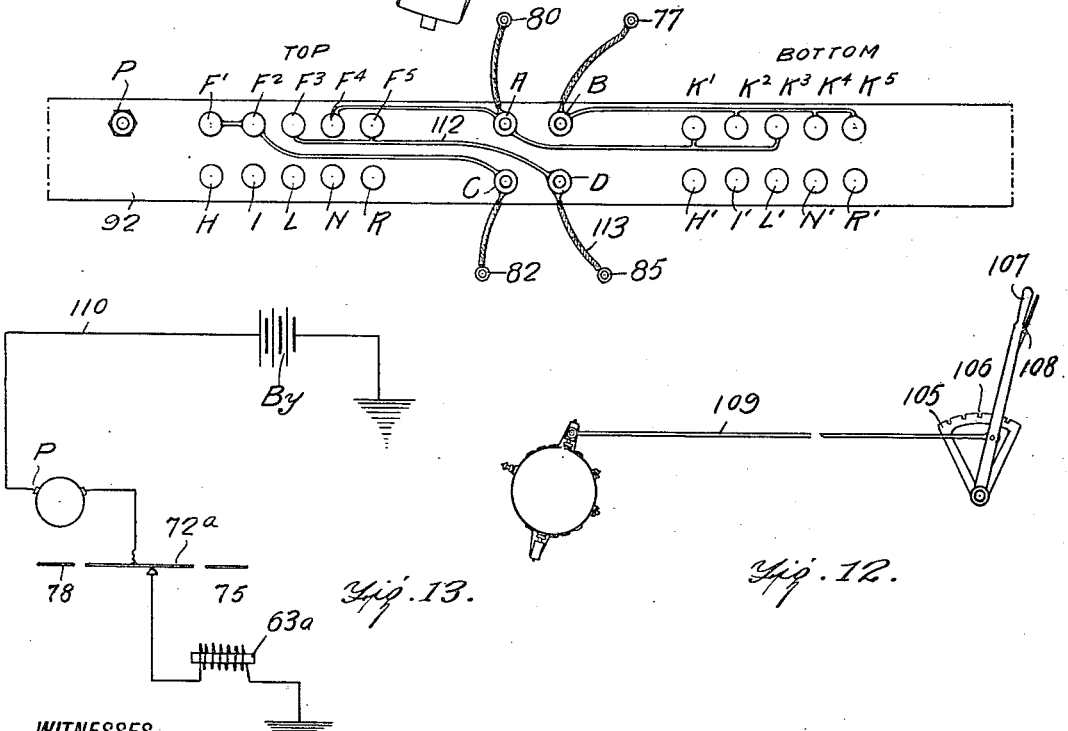

ANDREW PHILLIP RIEDELE, OF BOWLUS, MINNESOTA.

ELECTRIC GEAR-SHIFTING MECHANISM.

1,319,246. Specification of Letters Patent. Patented Oct. 21, 1919.

Application filed December 23, 1912. Serial No. 738,230.

*To all whom it may concern:*

Be it known that I, ANDREW P. RIEDELE, a citizen of the United States, and a resident of Bowlus, in the county of Morrison and State of Minnesota, have made certain new and useful Improvements in Electric Gear-Shifting Mechanism, of which the following is a specification.

My invention relates to improvements in gear shifting devices, and it consists in the combinations, constructions, and arrangements herein described, and claimed.

An object of my invention is to provide a device which will prevent the stripping of the teeth of the gears when the latter are shifted, by means of a construction which only permits the shifting of the gears when the load has been taken off from them.

A further object of my invention is to provide an electric device for shifting gears which may be set for certain speeds so that when the main clutch is thrown out and the load is taken off from the gears the latter will be shifted to produce the proper speed when the main clutch is again thrown in.

A further object of my invention is to provide a novel form of mechanism comprising electro-magnets and a switch for actuating the same the operation of said magnets serving to effect the shifting of the gears.

Other objects and advantages will appear in the following specification and the novel features of the device will be particularly pointed out in the appended claims.

My invention is illustrated in the accompanying drawings forming part of this application in which—

Figure 1 is a plan view of the device with the casing cover removed, and certain parts being shown in section for the sake of clearness, Fig. 2 is a detail view of a centering detent, Fig. 3 is a vertical sectional view along the line 3—3 of Fig. 1, looking in the direction of the arrows, Fig. 4 is a bottom plan view of certain stationary contacts, Fig. 5 is a sectional view along the line 5—5 of Fig. 3, looking in the direction of the arrows, Fig. 6 is a side view of a portion of the device, Fig. 7 is a detail view showing one position of the slide rod, Fig. 8 is a view similar to Fig. 7 showing another position of the rod, Fig. 9 is a view similar to Fig. 8 showing another position of the rod, Fig. 10 is a side view of a switch which forms part of the gear shifting device, Fig. 11 is a view showing the development of the outer surface of the switch, Fig. 12 is a detail view showing the means for shifting the switch arms, and Fig. 13 is a diagrammatic view of a typical circuit effected by the switching operation.

In carrying out my invention I provide a main casing 1 comprising the gear compartment proper, 2, and a smaller compartment, 3, in which the mechanism for operating the gears is contained. Disposed within the compartment 2 are the shafts 4 and 5. The former bears the fixed gears 6, 7, 8 and 9 and the latter bears a clutch member $11^a$ and the slidable gears 12 and 13. A driving shaft $5^d$ is provided at one end with a clutch member 11 arranged to be engaged by the clutch member $11^a$ to transmit motion from the shaft $5^d$ to the shaft 5, and with a fixed gear 10. The shaft $5^d$ bears on the opposite end a clutch member 16 which is arranged to engage the clutch portion 17 of the wheel 18. The latter is on the driving shaft 19 of the engine. A stub shaft 14 is also disposed within the casing and bears a gear 15 which is permanently in mesh with the gear 6. The gears 12 and 13 are provided with a feather arranged to slide in a slot $5^x$ in a shaft 5, and each gear is provided with a collar such as that shown at $12^x$ and $13^x$ which is arranged to be moved by a yoke, as will be explained later.

The wheel 18 is provided with a series of teeth 20 on its periphery which are arranged to mesh with the gear 21 on a shaft 22. The end of this shaft extends within the casing and forms a clutch member $22^x$ which is arranged to be engaged by a clutch member 23 for imparting movement to a shaft 24. The member 16 which forms part of the main clutch may be thrown out of engagement by means of the lever 25 (see Fig.

3) which is pivoted at 26, and whose end engages the pins 27 of a strap or split ring 28 carried in the grooved collar 29. This ring is connected with a lever 30 which is pivoted at 31 and whose yoked end 32 engages in a collar 33 on the rod 34. The latter is provided with a yoke 35 arranged to operate the clutch member 23. It will be apparent that if the lever 25 is shifted in the direction shown by the curved arrow in Fig. 3 the main clutch will be thrown out, while the auxiliary clutch member 23 will be thrown in, thereby imparting motion to the shaft 24 through the medium of the wheel 18 and the gear 21.

On the shaft 24 is disposed a worm 36 which engages a gear 37 on a shaft 38. The latter shaft bears an eccentric 39 having an arm 40 which is provided at its end with the branches $40^a$ and $40^b$. The branch $40^a$ is pivotally connected with an arm $41^a$ of a slide rod $42^a$ which is disposed in a tube $43^a$. The latter is provided with a slot $44^a$ through which the arm $41^a$ extends. It will be apparent that as the eccentric 39 turns the slide rod $42^a$ will be reciprocated within the tube $43^a$.

The arm $40^b$ is connected to an arm $41^b$ which moves a slide rod $42^b$ in a tube $43^b$. The tube $43^a$ is mounted to slide in the walls of the casing 1 (see Fig. 2) and is connected by means of an arm 45 (see Fig. 6) with a sleeve 46 which is slidably mounted in the walls of the casing 1. The end of this sleeve is provided with a yoke 47 arranged to engage the collar $13^x$ as shown in Fig. 2. The tube $43^b$ is also slidably mounted in the walls of the casing and is connected by means of an arm 48 with a slidable rod 49, one end of which extends within the tube 46. Secured to the rod 49 is a yoke 50 which is arranged to engage the collar $12^x$.

Referring now to Fig. 6, it will be seen that I have provided a pair of levers 51 and 52 respectively for normally operating the gear shifting device. The lever 51 is connected with a sleeve 53 bearing a collar 54 which has an arm 55 pivotally connected with a lug 56 secured to the tube $43^a$. The lever 52 is mounted on the end of a shaft 57 which extends through the sleeve 53 and is provided with a collar 58 having an arm 59, which is pivotally connected with the lug 60 on the tube $43^b$. The sleeve 53 is mounted in a bearing 61. The end of the shaft 57 is mounted in a bearing 62. The shifting of the lever 51 will move the tube $43^a$, while the shifting of the lever 52 will move the tube $43^b$. Carried by the tube $43^a$ are the magnets $63^a$, which have a common armature $64^a$. The end of this armature, as will be seen from Fig. 5, is arranged to extend into a slot in the tube $43^a$. When drawn up by the magnet it is designed to enter one of the slots $65^a$ or $66^a$ in the slide rod $42^a$ (see Figs. 7, 8 and 9). It will be noted in these figures that the outer ends of these slots are beveled and that the sides of the armature itself slant to correspond with the beveled ends of the slots.

As stated previously, the magnets $63^a$ are carried by the tube $43^a$. The frame which carries these magnets is extended, as shown in Figs. 3 and 5, and bears a spring-pressed contact member $67^a$. The frame also bears an elongated spring contact member $68^a$. Carried by the tube $43^b$ are the parts $63^b$, $64^b$, $67^b$ and $68^b$ which are precisely similar to the corresponding parts carried by the tube $43^a$.

Disposed above the contacts $67^a$ and $67^b$ are stationary contacts like those shown in Fig. 4. These stationary contacts are supported upon a pair of cross members 69 and 70, the ends of the cross members being secured to the walls of the compartment 3 shown in Fig. 5. On top of the cross members are a pair of insulating strips 71. Centrally disposed on one of these strips is a contact $72^a$ which is connected by means of a conductor $73^a$ with a contact screw $74^b$. A similar contact member $72^b$ disposed on the opposite strip 71 is connected by means of a conductor $73^b$ with a contact screw $74^a$. A contact 75 is connected by means of the conductor 76 to the binding post 77 (see Figs. 1 and 5). The contact 78 (see Fig. 4) is connected by the conductor 79 with the binding post 80. The conductor 81 connects the binding post 82 with a contact 83, while the conductor 84 connects the binding post 85 with a contact 86. The contacts $74^a$ and $74^b$, are insulated from the cross member 69, while the contacts 83 and 86 are insulated from the cross member 70.

Referring now to Figs. 5, 10 and 11, it will be noted that the casing 1 is enlarged to form a bearing $1^x$ and that the shaft 38 is prolonged. Mounted for rotation on the bearing $1^x$ are the arms 87 which are provided with spring actuated plungers 88 and 89 on opposite sides thereof. The plunger 88 carries a shoe 90, while the plunger 89 carries a similar shoe 91. These shoes are arranged to engage contact buttons disposed on the periphery of an insulating wheel or ring 92, which is rigidly mounted on the bearing $1^x$. There are two rows of these buttons or contacts as will be seen from Fig. 11, which is a development of the surface of the wheel or ring 92. These buttons I have designated by H, I, L, N and R corresponding to high, intermediate, low, neutral and reverse. A second series of buttons are designated by H', I', L', N' and R' and are disposed on the opposite side of the ring from the first mentioned buttons. These two series of buttons lie in the same plane as shown in Fig. 11. A parallel series is shown at F', $F^2$, $F^3$, $F^4$, $F^5$ and K', $K^2$, $K^3$, K⁴ and K⁵. On one side of the ring is a binding post P, while A, B, C, and D designate other binding posts. Referring again to Fig. 5 it will be seen that I fasten an insulating collar 93 to the shaft 38. On this collar is a conducting ring 94 upon which a spring-pressed plunger 95 bears (see Fig. 10). This plunger is in electrical connection with the binding post P. On the interior of the wheel or ring 92 are two semi-circular conductors 96 and 97 respectively against which a spring-pressed plunger 98, which is carried by the collar 93, bears. This plunger is in electrical connection with the ring 94 by means of a conducting strip 99 (as shown in Fig. 5). A semi-circular conducting strip 100 is mounted on one side of the wheel or ring 92, while a similar but larger conducting strip 101 is mounted on the same side of the ring, but on the opposite side of the shaft 38.

The buttons N, L and H are electrically connected with the conducting strip 101 by means of screws such as those shown at 102 while the buttons I and R are connected with the strip 100 by the screws 103. On the other side of the shaft the buttons N', I' and H' are connected to the strip 100, while the buttons R' and L' are connected to the strip 101.

In Fig. 12, I have shown the means by which the switching device is set to shift the gears to predetermined speeds. This may consist of a segment 105 having slots 106 arranged to correspond with the different speeds. A lever 107 is provided with a locking member 108 arranged to engage in the slots 106. The lever is connected by a link 109 with one of the arms 87.

From the foregoing description of the various parts of the device the operation thereof may be readily understood.

Let us assume that the apparatus is in the position shown in Fig. 10 and that the operator wishes to throw in the low speed. He does this by means of the lever 107, permitting the locking member 108 to lock the lever in the required position. The shifting of the lever 107 will shift the arms 87 so as to bring the shoes 90 and 91 into contact with the buttons or contacts L and F³ on one side of the ring 92 and L' and K³ on the opposite side. Current will now flow from the battery B$y$ (see Fig. 13) through the conductor 110 to binding post P, thence to the ring 94 (see Figs. 10 and 5) conductor 99, pin 98, and if the pin is in the position shown in Fig. 10, by means of the semi-circular strip 97 and the conductor 111 to the strip 101, thence through screw 102, button L, shoe 90, button F³, conductor 112, binding post D, conductor 113, binding post 85, conductor 84, contact 86, contact spring 68ᵇ, contact 74ᵇ, conductor 73ᵃ, contact 72ᵃ, spring contacts 67ᵃ, magnet 63ᵃ and ground.

The magnet 63ᵃ will thereupon become energized and draw in its armature 64ᵃ unless it should happen to be in the position shown in Fig. 7. This is the position where the eccentric is on dead center. In that case the armature will not be drawn in because it is in registration with a partition 115 which prevents the entrance of the armature 64ᵃ in the slot. If the rod 42ᵃ should be in any other position than that shown in Fig. 7 then it will enter one of the two slots 65ᵃ or 66ᵃ. In the present instance it will enter the slot 66ᵃ for the reason that the device has been set for low speed. In this connection, I wish to call particular attention to the fact that the collar or ring 92 is provided with two semi-circular conductors 96 and 97 against which the spring pin 98 bears. The spring 98, it will be remembered, is carried by the collar 93, which is fixed on the shaft 38. When the eccentric, which is also on the shaft 38, is in one position so as to push the slidable rod 42ᵃ toward one end of its stroke the pin 98 is in engagement with one of these semi-circular conductors, but when the eccentric is in another position so as to move the slidable rod 42ᵃ in the opposite direction and thereby bringing the other slot into registration with the armature 64ᵃ, then the pin 98 is in contact with the companion semi-circular conductor. Thus it is that whenever the pin 98 is in contact with the conductor 97 and the device is set for low speed, the armature 64ᵃ will fall in the slot 66ᵃ. As the eccentric continues to move the rod 42ᵃ will be moved as stated backward and forward. The movement of the rod 42ᵃ will cause the engagement of the central portion 42ˣ with the armature 64ᵃ, and will therefore move the armature, the magnet, and the sleeve 43ᵃ in the direction indicated by the arrow in Figs. 2, 3 and 8. This will cause a corresponding movement of the arm 45 and the sleeve 46, the arm 47, the collar 13ˣ and the gear 13, thereby bringing the latter gear into mesh with the gear 7.

This will set the gears for low speed as soon as the main clutch is again thrown in. The main clutch will then drive the shaft 5 through the medium of the hollow shaft 5ᵈ, gears 10 and 9, shaft 4, gear 7, and gear 13 which is slidably disposed on the driven shaft 5.

When the sleeve 43ᵃ has moved far enough to bring the gears into mesh then the contact 67ᵃ has moved away from the contact 72ᵃ on to the contact 75, thereby breaking the circuit of the magnet 63ᵃ. At the same time the spring contact 68ᵃ has moved away from the contact button 74ᵃ. It will be impossible therefore to energize the magnet 63ᵇ until the magnet 63ᵃ is brought back to a position to permit the engagement of the contact 67ᵃ with the contact 72ᵃ, or when the spring contact 68ᵃ will again move on to the contact button 74ᵃ. Therefore when one of the magnets is moved it immediately puts the other out of commission for the time being, so that there is no danger of operating both magnets and causing a stripping of the gears. The breaking of the circuit of the magnet 63ᵃ will cause the retraction of the armature out of the slot 66ᵃ. This retraction will not necessarily take place at the moment that the circuit is broken, for, as stated before, the sides of the armature and the end of the slot are beveled so that the partition 42ˣ holds the armature until the beginning of the reverse stroke of the slidable rod 42ᵃ, but the moment the reverse stroke begins the armature is released, so that the sleeve is not shifted on the reverse stroke or on any subsequent strokes until the magnet is again energized. The purpose of beveling these parts so as to maintain the armature in contact with the portion 42ˣ is to insure the complete engagement of the gears. It will be seen that as long as the rod is traveling in the direction shown in Fig. 8, the armature will be held even though the circuit is broken, but, as stated before, the moment the rod reverses its movement the armature is drawn out of the way.

The rod 42ᵃ may now be reciprocated back and forth without shifting the gears. The operator of the vehicle may then throw in the main clutch which throws out the auxiliary clutch and thus stops the reciprocation of the rod 42ᵃ. In order to insure the proper position of the sleeve 43ᵃ I arrange a spring-pressed detent 125 such as that shown in Fig. 2, which is provided with a V-shaped edge 126 arranged to engage notches such as those shown at 127. There are two of these detents, one for the tube 43ᵃ and one for the tube 43ᵇ. When force is exerted by the eccentric to move the tubes the detents 125 are lifted up the inclined surfaces of the slots and rest on the outer surface of the tube until they reach another slot into which they drop.

The vehicle will now run on low speed. Should the operator wish to place the gears back into the neutral position as shown in Fig. 1, he will shift the lever 107 into the low speed position which will set the shifting arms 87 into the position shown in Fig. 10. The current will now flow from the battery through the conductor 110 to binding post P, through spring contact 95, thence to the ring 94 (see Figs. 10 and 5) conductor 99, pin 98, (if the pin be in the position shown in Fig. 10 the circuit will not be completed until the shaft 38 has turned sufficiently far to bring the pin into contact with the semicircular strip 96) strip 96, segment 100, button N′, shoe 91, button K⁴ to binding post B, then to post binding 77, through conductor 76 to contact maker 75, then through spring contact 67ᵃ, magnet and ground. The magnet 63ᵃ will thereupon become energized and draw in its armature 64ᵃ into the slot 66ᵃ. As the eccentric moves on the reverse stroke it brings into engagement the end portion of the slot 66ᵃ (see Fig. 9) and as the rod 42ᵃ continues to move in the direction indicated by the arrow in Fig. 9 it moves the armature, the magnet, and the sleeve 43ᵃ; this will cause a corresponding movement of the arm 45 and the sleeve 46, the arm 47, the collar 13ˣ and the gear 13, thereby bringing the latter gear into the neutral position as shown in Fig. 1. When the magnet 63ᵃ moves as above stated the spring contact 67ᵃ moves away from the contact maker 75 onto the contact maker 72ᵃ thereby breaking the circuit. However the armature will not be retracted until the reverse stroke of the eccentric as the sides of the armature 64ᵃ as well as the sides of the slot 66ᵃ are beveled and will hold the armature in position until the reverse stroke.

Therefore one advantage of this device is that it may be set for any of certain given speeds while running at any of said speeds; thus the device may be set so that one may shift from low to intermediate, intermediate to high, high to reverse, and vice versa. It is not possible to go directly from low into high speed, or from high directly into low, nor from intermediate into reverse, or from reverse into intermediate, because as has been explained above the energizing magnets which control these speeds are put out of commission until the device is brought back to neutral. In the case of shifting for instance from low to intermediate, the device is brought back to neutral, but it is brought back automatically and is then immediately shifted to the desired speed. This takes place in very short time so the effect is as if one actually shifted from one speed to another without going to neutral. To illustrate the manner in which one may go from low speed to intermediate speed let us assume that the vehicle is running on low speed with the handle 107 set for low speed. Instead of shifting the handle 107 into the neutral position it is shifted directly into the intermediate position. Current will flow from the battery through 110, P, 95, 94, 99, 98, 96, 100, button I′, shoe 91, button K², binding post B, 77, 76, 75, 67ᵃ, magnet and ground. The magnet 63ᵃ will thereupon become energized and draw in its armature 64ᵃ into the slot 66ᵃ. The operator then releases the main clutch which throws in the auxiliary clutch and sets the eccentric in motion. As the eccentric continues to rotate it brings into engagement the end portion of the slot 66ᵃ with the armature 64ᵃ (as shown in Fig. 9) moving the rod 42ᵃ in the direction indicated by the arrow in Fig. 9. This causes a corresponding movement of the magnet 63ª, sleeve 43ª, arm 45, rod 46, yoke 47 and the gear 13, bringing the latter gear into neutral position. On the reverse stroke the armature 64ª is retracted out of the slot 66ª. The eccentric will continue to rotate until the point 98 will again come in contact with the semicircular strip 96 when the current will flow from the battery through 110, P, 95, 94, 99, 98, 96, 100, button I', shoe 90, button F² to binding post C, then to binding post 82 also conductor 81 to contact button 83, through spring contact 68ª to contact button 74ª, thence through conductor 73ᵇ to contact maker 72ᵇ, through the contact spring 67ᵇ, magnet 63ᵇ and ground. The magnet 63ᵇ will thereupon become energized and draw in its armature 64ᵇ into the slot of the rod 42ᵇ which corresponds to the slot 65ª of the rod 42ª (see Figs. 1, 7, 8 and 9). As the eccentric continues to move the armature 64ᵇ engages at the end of the slot with the portion corresponding to 64ª and moves the magnet and sleeve 43ᵇ. This will cause a corresponding movement of the arm 48, rod 49, yoke 50, the collar 12ˣ and the gear 12, thereby bringing the latter gear in mesh with the gear 8, or into the intermediate position. On the reverse stroke the armature 64ᵇ will retract from the slot. Therefore when the magnet moves as above stated, the spring contact 68ᵇ moves along with it and moves away from the contact button 86, thereby putting the magnet 63ª out of commission for the time being, or until the spring contact 68ᵇ again comes in contact with the button 86. It will thus be plainly seen that when shifting from low speed into intermediate speed the eccentric must make two revolutions, one to bring the low gear to neutral position, the next to place the gear into the intermediate position. The time during which the gear is in neutral position is very short, this operation being conducted in a second or so. The operator having obtained the desired speed may again throw in the main clutch.

The shifting of the gears by setting the device preparatory to throwing out the main clutch is especially desirable where one is approaching a hill; thus when approaching the hill on intermediate speed, the only thing necessary to do is to set the device for low speed and to wait until the hill is reached; then all that is necessary is to release the main clutch, throw the auxiliary clutch in, and when the driving mechanism has picked up on low speed, to release the auxiliary and throw in the main clutch. This is done simply by pressure of the foot pedal in the ordinary manner. The hands of the operator therefore are free to guide the machine and to control it. This is especially advantageous where an automobile is about to enter a sandy stretch of road. In the ordinary machine the low speed must be thrown in by means of the hand which must be lifted from the steering wheel in order to operate the gear shifting mechanism, but if ever a driver wants both hands to guide and control the machine it is when he is driving through sand. The advantage of my device will therefore be apparent.

In Fig. 6 I have shown a manual means for operating the gear shifting device in case the electric gear shift should get out of order. The lever 51 as has been previously explained shifts the tube 43ª, while the lever 52 shifts the tube 43ᵇ. By moving these levers in one direction or the other the proper speed may be obtained.

I claim:

1. The combination with a series of slidable gears adapted to produce different speeds, of means for automatically shifting the gears, and electro-magnetic means for controlling the operation of the gear shifting means.

2. The combination with a plurality of gears, certain of said gears being laterally movable to engage other gears for producing different speeds, of means for shifting each of said laterally movable gears, said means comprising a sleeve connected to a laterally moving gear, a shaft arranged to reciprocate within said sleeve, and means for locking said shaft to said sleeve.

3. The combination with a plurality of gears, certain of said gears being laterally movable to engage other gears for producing different speeds, of means for shifting said laterally movable gears, said means comprising a sleeve connected with a laterally moving gear, a shaft arranged to reciprocate within said sleeve, means for locking said shaft to said sleeve, means for reciprocating said shaft, said means comprising an eccentric, a drive wheel, and a clutch disposed between said drive wheel and said eccentric for communicating the movement of the drive wheel to the eccentric.

4. The combination with a plurality of gears, certain of said gears being movable laterally to engage other gears for producing different speeds, of a fly wheel, a main clutch for transmitting the movement of the fly wheel to certain of said gears, a slidable sleeve connected with a laterally movable gear, a shaft slidably disposed within said sleeve, means including an eccentric for reciprocating the shaft, means including an auxiliary clutch for transmitting the movement of the fly wheel to the eccentric, means for simultaneously throwing out the main clutch and throwing in the auxiliary clutch, and means for locking the shaft to the sleeve.

5. The combination with a plurality of gears, certain of said gears being movable laterally to engage other gears for producing different speeds, of a fly wheel, a main clutch for transmitting the movement of the fly wheel to certain of said gears, a slidable sleeve connected with a laterally movable gear, a shaft slidably disposed within said sleeve, means including an eccentric for reciprocating the shaft, means including an auxiliary clutch for transmitting the movement of the fly wheel to the eccentric, means for simultaneously throwing out the main clutch and throwing in the auxiliary clutch, means for locking the shaft to the sleeve, said locking means comprising a magnet carried by said slidable sleeve, and an armature controlled by said magnet and arranged to engage said slidable shaft.

6. The combination with a plurality of gears, certain of said gears being movable laterally to engage other gears for producing different speeds, of a fly wheel, a main clutch for transmitting the movement of the fly wheel to certain of said gears, a slidable sleeve connected with a laterally movable gear, a shaft slidably disposed within said sleeve, means including an eccentric for reciprocating the shaft, means including an auxiliary clutch for transmitting the movement of the fly wheel to the eccentric, means for simultaneously throwing out the main clutch and throwing in the auxiliary clutch, means for locking the shaft to the sleeve, said locking means comprising a magnet carried by said slidable sleeve, an armature controlled by said magnet and arranged to engage said slidable shaft, and means for causing the armature to engage the shaft at a predetermined position of the latter.

7. The combination with a plurality of gears, certain of said gears being movable laterally to engage other gears for producing different speeds, of a fly wheel, a main clutch for transmitting the movement of the fly wheel to certain of said gears, a slidable sleeve connected with a laterally movable gear, a shaft slidably disposed within said sleeve, means including an eccentric for reciprocating the shaft, means including an auxiliary clutch for transmitting the movement of the fly wheel to the eccentric, means for simultaneously throwing out the main clutch and throwing in the auxiliary clutch, means for locking the shaft to the sleeve, said locking means comprising a magnet carried by said slidable sleeve, an armature controlled by said magnet and arranged to engage said slidable shaft, means for causing the armature to engage the shaft at a predetermined position of the latter, said last named means comprising a rotatable switch having a pair of semi-circular contact members, and a contact pin arranged to engage said contact members successively, each of said contact members corresponding to a particular position of said shaft.

8. The combination with a plurality of gears, certain of said gears being movable laterally to engage other gears for producing different speeds, of a fly wheel, a main clutch for transmitting the movement of the fly wheel to certain of said gears, a slidable sleeve connected with a laterally movable gear, a shaft slidably disposed within said sleeve, means including an eccentric for reciprocating the shaft, means including an auxiliary clutch for transmitting the movement of the fly wheel to the eccentric, means for simultaneously throwing out the main clutch and throwing in the auxiliary clutch, means for locking the shaft to the sleeve, said locking means comprising a magnet carried by said slidable sleeve, an armature controlled by said magnet and arranged to engage said slidable shaft, means for causing the armature to engage the shaft at a predetermined position of the latter, said last named means comprising a rotatable switch having a pair of semi-circular contact members, a contact pin arranged to engage said contact members successively, each of said contact members corresponding to a particular position of said shaft, a spring contact carried by said magnet, and a stationary contact arranged to be engaged by said spring contact, the movement of said spring contact off from the stationary contact causing the deënergization of the magnet.

9. In a gear shifting device, a plurality of gears, certain of said gears being movable laterally to engage other gears for producing different speeds, a main fly wheel, an integral gear carried by said main fly wheel, a main clutch for said fly wheel, a slidable sleeve secured to a laterally movable gear, a slidable shaft disposed within said sleeve, means for locking said shaft to said sleeve, an auxiliary shaft, a gear on said auxiliary shaft arranged to engage the gear on said fly wheel, a second auxiliary shaft, a worm on said second auxiliary shaft, a third auxiliary shaft, a gear on said third auxiliary shaft arranged to mesh with said worm, an eccentric on said third auxiliary shaft, an arm connecting said eccentric with said slidable shaft, an auxiliary clutch for connecting said first named auxiliary shaft and said second named auxiliary shaft, and means for simultaneously throwing out said main clutch and throwing in said auxiliary clutch for simultaneously throwing in said main clutch and throwing out said auxiliary clutch.

10. In a gear shifting device, a plurality of gears, certain of said gears being movable laterally to engage other gears for producing different speeds, a slidable tube connected with each laterally movable gear, a slidable rod disposed within said slidable tube, automatic means for reciprocating said slidable rod, means for locking said slidable rod to its tube at a predetermined position of the rod with respect to the tube, said locking means comprising a magnet carried by the tube, an armature arranged to engage said slidable rod, a rotatable switch having a series of contacts corresponding to different positions of the slidable rod and a series of stationary contacts, a movable bridging member arranged to engage said stationary contacts, and means for shifting said bridging member to correspond with a predetermined speed.

11. In a gear shifting device, a plurality of gears, certain of said gears being movable laterally to engage other gears for producing different speeds, a slidable tube connected with each laterally movable gear, a slidable rod disposed within said slidable tube, automatic means for reciprocating said slidable rod, means for locking said slidable rod to its tube at a predetermined position of the rod with respect to the tube, said locking means comprising a magnet carried by the tube, an armature arranged to engage said slidable rod, a rotatable switch having a series of contacts corresponding to different positions of the slidable rod and a series of stationary contacts, a movable bridging member arranged to engage said stationary contacts, means for shifting said bridging member to correspond with a predetermined speed, and manual means for shifting the tube independently of the automatic shifting means.

12. In mechanism of the class described, the combination with a driving member, of variable speed transmission gears, gear selecting means, and mechanism frictionally to engage the said driving means and operative when so engaged to effect a driving connection of the selected transmission gear.

13. In mechanism of the class described, the combination with a power driven member, of a transmission shaft separate therefrom, variable speed transmission gears, means to indicate a gear to be placed in operative connection with the said shaft, and means frictionally to engage the said member to effect the selection of a gear and to place it in said operative connection.

14. The combination with a rotatable power driven member, of a transmission shaft, transmission gears, a clutch to connect the member and the shaft through the intermediary of the transmission gears, means to indicate and determine a gear to be selected, and mechanism to engage the said rotatable member and place the selected gear in operative connection with the transmission shaft.

15. The combination with a rotatable power driven member, of a transmission shaft, transmission gears, a clutch coöperating with said gears to connect the member and the shaft, means to indicate and determine a gear to be selected, mechanism to engage the said rotatable member and place the selected gear in operative connection with the transmission shaft, and means to operate said mechanism at will.

16. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, and means to operate the mechanism at will.

17. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, and means to control the operation of the said mechanism at will.

18. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, and a single means to control the operation of said clutch and said mechanism.

19. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, and a lever operative to actuate the said mechanism when the clutch is released.

20. In a mechanism of the class described, the combination with a source of driving power, of transmission gears, a clutch lever and clutch, means to select and indicate a transmission gear to be used, mechanical means applicable to the source of power to position the selected gear in driving engagement and means to operate the said mechanical means by the movement of the clutch lever.

21. The combination with power transmitting mechanism, comprising a transmission shaft and gears movable into driving connection therewith of a motor therefor, selecting means for different gears, comprising a movable arm, a movable positioning rod, and means to connect the arm to the rod and to transmit motion thereto, and means to engage the motor and to shift the selected gear into driving position.

22. In combination with driving and driven members, a variable speed transmission between said members comprising shiftable power transmitting elements, motive means for shifting said power transmitting elements, and electrically controlled selecting mechanism for forming operative connections between the motive means and the elements to be shifted.

23. In combination with driving and driven members, variable speed transmission between said members and comprising shiftable power transmitting elements, motive means for shifting said power transmitting elements, electrically operated selecting mechanism for connecting and disconnecting the motive means, and certain of said elements, and means for controlling the selecting mechanism.

24. In combination with driving and driven members, a variable speed transmission between said members comprising a plurality of shiftable power transmitting elements adapted to cause changes in speed relationship between the driving and driven members, devices for shifting said power transmitting elements, a motor for shifting said devices, and electrically controlled means for establishing driving relationship between the motor and different shifting devices.

25. In combination with driving and driven members, a variable speed transmission between said members comprising a plurality of shiftable power transmitting elements adapted to cause changes in speed relationship between the driving and driven members, devices for shifting said power transmitting elements, a motor for shifting said devices, and electrically operated means selectively connecting different shifting devices to the motor.

26. In combination with driving and driven members, a variable speed transmission between said members comprising a plurality of shiftable power transmitting elements adapted to cause changes in speed relationship between the driving and driven members, devices for shifting said power transmitting elements, a motor for shifting said devices, and a selecting mechanism comprising a plurality of magnets for connecting the different shifting devices to the motor.

27. In combination with driving and driven members, a variable speed transmission between said members, comprising movable power transmitting elements, a motor, a motor driven member for shifting said elements, and electrically operated means for selectively connecting the power transmitting elements to and disconnecting them from said motor driven member.

28. In combination with driving and driven shafts, a variable speed transmission between said shafts comprising movable power transmitting elements, shifting devices operatively connected to said elements, a motor, a member adapted to be driven by said motor, and electrically controlled means for selectively connecting said member to or disconnecting it from said devices.

29. In combination with driving and driven shafts, a variable speed transmission comprising movable power transmitting elements serving to disconnect said shafts or to vary the speed relationship between the shafts, or to vary the direction in which the driven shaft is driven with respect to the driving shaft, a motor for selectively shifting said power transmitting elements, switch mechanism having different operative positions corresponding to the different changes which may be effected by said transmission, and means by which when the switch mechanism is moved to any operative position, power transmitting elements which are required to effect the change in the transmission corresponding to that position are shifted by said motor.

30. In combination with driving and driven shafts, a variable speed transmission between said shafts, and comprising a plurality of movable power transmitting elements, a motor for selectively shifting said elements to render the transmission neutral or inoperative for the transmission of power, to effect different speed changes between the driving and driven shafts, and to vary the direction of drive, switch mechanism having operative positions corresponding to neutral and speed positions of the transmission, and means responsive to the movement of the switch mechanism from one operative position to another for causing said motor to shift the proper power transmitting elements to effect the change in the transmission corresponding to the position to which the controller is moved.

31. In combination with driving and driven members, a variable speed transmission between said members comprising movable power transmitting elements, motive means for shifting the power transmitting elements, and means comprising movable locking devices for connecting and disconnecting the motive means, and the power transmitting elements.

32. In combination with driving and driven members, a variable speed transmission between said members comprising movable power transmitting elements, motive means for shifting the power transmitting elements, means comprising movable locking devices for connecting and disconnecting the motive means and the power transmitting elements, magnets for shifting said locking devices, and means for selectively controlling the energization of the magnets.

33. In a vehicle an engine and variable speed gearing mechanism, a member slidingly mounted, and normally disconnected from said speed gearing mechanism, driving connections between the engine and said sliding member, and means for connecting said sliding member to the speed gears.

34. In a vehicle an engine and variable speed gearing mechanism, a member slidingly mounted, and normally disconnected from said speed gearing mechanism, releasable driving connections between the engine and said sliding member, and means for connecting said sliding member to the speed gears.

35. In a vehicle an engine and variable speed gearing mechanism, a member slidingly mounted, and normally disconnected from said speed gearing mechanism, releasable driving connections between the engine and said sliding member, and means for selectively connecting said sliding member to the various speed gears.

36. In a vehicle an engine and variable speed gearing mechanism, a member slidingly mounted, and normally disconnected from said speed gearing mechanism, frictional driving connections between the engine fly-wheel and said sliding member, and means for connecting said sliding member to the speed gears, for shifting the latter.

37. In a vehicle an engine and variable speed gearing mechanism, a member slidingly mounted, driving connections between the engine and said sliding member, mechanism for selectively connecting said sliding member to the various speed gears, and manually controlled means for selectively releasing the selective connecting means.

ANDREW PHILLIP RIEDELE.

Witnesses:
  NORMAN MCLEOD,
  F. B. STEVENS.